United States Patent
Gade et al.

(10) Patent No.: US 9,509,643 B1
(45) Date of Patent: Nov. 29, 2016

(54) NETWORK-BASED CONTENT DISCOVERY USING MESSAGES OF A MESSAGING PLATFORM

(71) Applicant: Twitter, Inc., San Francisco, CA (US)

(72) Inventors: Krishna Gade, Mountain View, CA (US); Daniel Loreto, New York, NY (US); Francesco G. Callari, Dobbs Ferry, NY (US); Julian M. Marinus, Brooklyn, NY (US); Yu-shuang Li, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 126 days.

(21) Appl. No.: 14/078,239

(22) Filed: Nov. 12, 2013

(51) Int. Cl.
*G06F 15/16* (2006.01)
*H04L 12/58* (2006.01)

(52) U.S. Cl.
CPC .................................... *H04L 51/00* (2013.01)

(58) Field of Classification Search
CPC ................................................ G06Q 30/0267
USPC ................................................... 709/204–206
See application file for complete search history.

(56) References Cited

U.S. PATENT DOCUMENTS

| | | | | |
|---|---|---|---|---|
| 2001/0032240 | A1* | 10/2001 | Malone et al. | 709/203 |
| 2010/0094878 | A1* | 4/2010 | Soroca et al. | 707/748 |
| 2010/0169137 | A1* | 7/2010 | Jastrebski | G06Q 20/04 715/215 |

* cited by examiner

*Primary Examiner* — David Lazaro
*Assistant Examiner* — Marie Georges Henry
(74) *Attorney, Agent, or Firm* — Osha Liang LLP

(57) ABSTRACT

A system, method, and computer-readable medium for identifying relevant content from a messaging platform. The method can include: identifying a context account; identifying a set of initial accounts of the messaging platform; selecting a set of relevant accounts from among the set of initial accounts; selecting a set of messages authored by the set of relevant accounts based at least on a recency of each of the set of messages; and providing the set of messages in response to a request.

19 Claims, 8 Drawing Sheets

NETWORK-BASED CONTENT DISCOVERY USING MESSAGES OF A MESSAGING PLATFORM

BACKGROUND

In recent years, messaging platforms and network-connected personal computing devices have become increasingly ubiquitous. Users are now able to create and share content across multiple devices in real-time. As the quantity and availability of user-generated and promoted content increases, so too does the importance of content discovery. Content discovery refers to functionality that provides and enables users to find interesting content by a service such as a messaging platform.

Simple content discovery techniques focus on immediate connections (e.g., friendship) within a relationship graph. While only surfacing content from immediate connections can be overly limiting, wider breadth approaches can lead to an overload of irrelevant and uninteresting content. Enabling users to more effectively discover new and interesting content can lead to higher engagement, growth, and potential revenue. Thus, as the availability of content increases, the potential impact of content discovery functionality will also increase.

SUMMARY

In general, in one aspect, the invention relates to a method for identifying relevant content from a messaging platform. The method can include: identifying a context account; identifying a set of initial accounts of the messaging platform; selecting, by a computer processor, a set of relevant accounts from among the set of initial accounts by weighting the initial accounts based at least on a relationship of at least a subset of the initial accounts with the context account within a connection graph depicting relationships among accounts of the messaging platform; selecting a set of messages authored by the set of relevant accounts based at least on a recency of each of the set of messages; and providing the set of messages in response to a request.

In general, in one aspect, the invention relates to a system for identifying relevant content based on messages from a messaging platform. The system can include: a computer processor; a content discovery module executing on the computer processor and configured to enable the computer processor to: identify a context account, identify a set of initial accounts of the messaging platform, select a set of relevant accounts from among the set of initial accounts by weighting the initial accounts based at least on a relationship of at least a subset of the initial accounts with the context account within a connection graph depicting relationships among accounts of the messaging platform, select a set of messages authored by the set of relevant accounts based at least on a recency of each of the set of messages, and provide the set of messages in response to a request.

In general, in one aspect, the invention relates to a non-transitory computer readable medium including computer readable program code for: identifying a context account; identifying a set of initial accounts of the messaging platform; selecting, by a computer processor, a set of relevant accounts from among the set of initial accounts by weighting the initial accounts based at least on a relationship of at least a subset of the initial accounts with the context account within a connection graph depicting relationships among accounts of the messaging platform; selecting a set of messages authored by the set of relevant accounts based at least on a recency of each of the set of messages; and providing the set of messages in response to a request.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
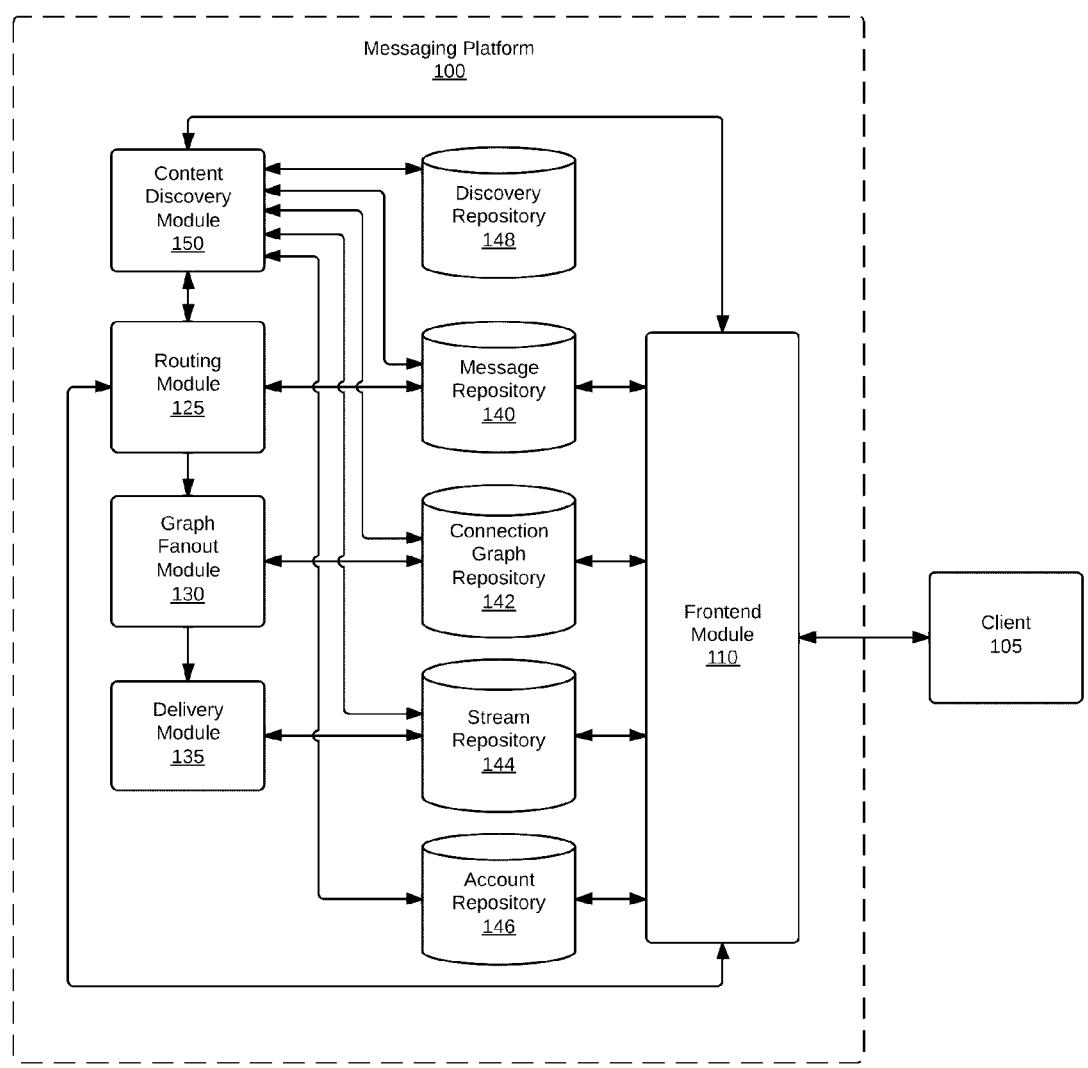
FIG. 1 shows a schematic diagram of a system, in accordance with one or more embodiments of the invention.

A portion of the disclosure of this patent document may contain material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for identifying relevant content from a messaging platform. A request for relevant content is received from a client. An initial set of accounts is identified and weighted based on one or more criteria (e.g., account data, context data associated with the request, etc.). A result set is selected based on the weighting and provided in response to the request. The result set can include highest ranked accounts and/or messages from highest ranked accounts, in accordance with various embodiments of the invention.

FIG. 1 shows a messaging platform (100) and a client (105) in accordance with one or more embodiments of the invention. As shown in FIG. 1, the messaging platform (100) has multiple components including a content discovery module (150), a discovery repository (148), a frontend module (110), a routing module (125), a graph fanout module (130), a delivery module (135), a message repository (140), a connection graph repository (142), a stream repository (144), and an account repository (146). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the messaging platform (100). In this case, the messaging platform (100) may be configured to allow the user to broadcast messages and/or to utilize other functionality of the messaging platform 100 by associating the user with a temporary account or identifier.

Figure 2:
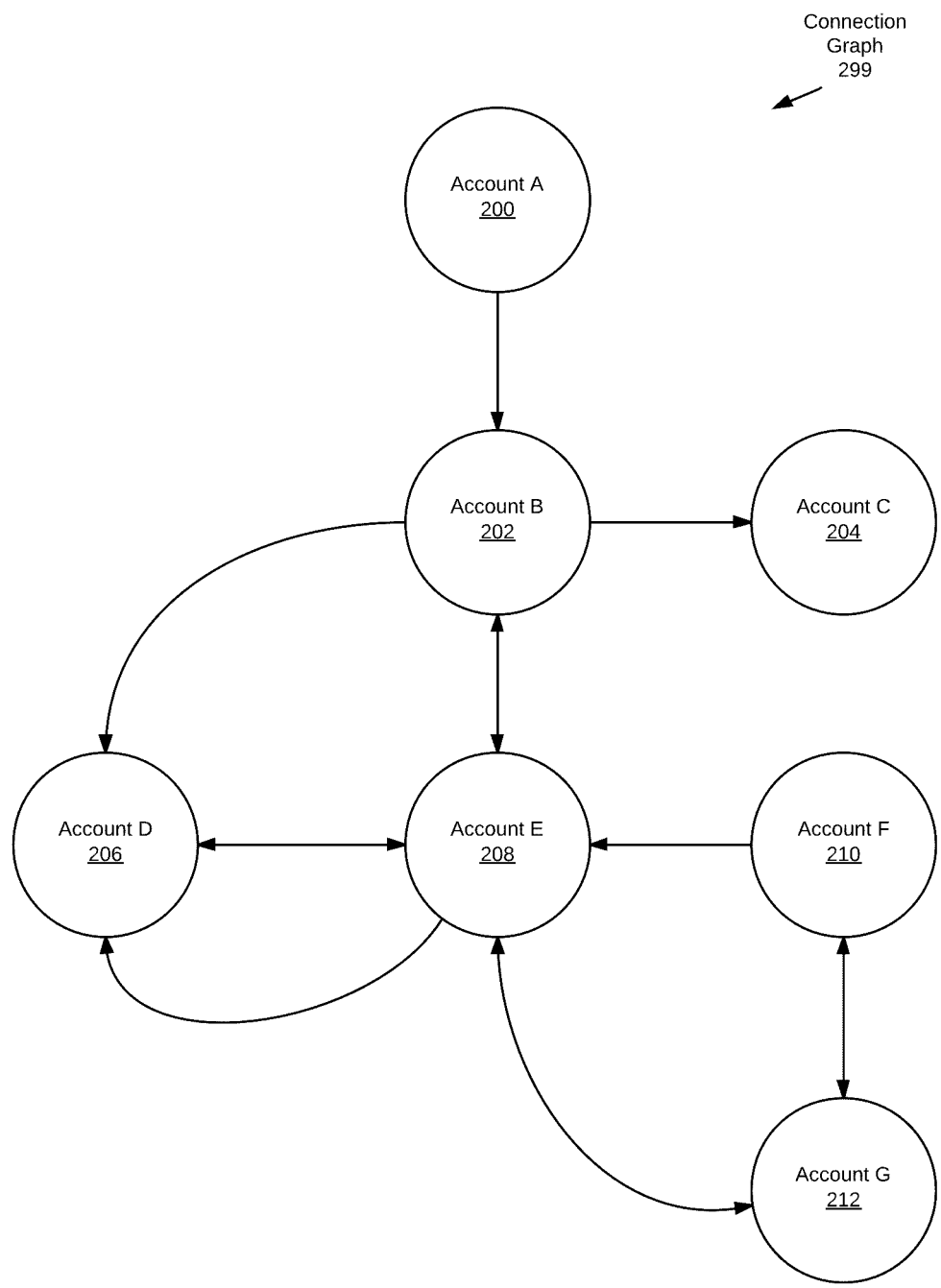
FIG. 2 shows an example depiction of a connection graph, in accordance with one or more embodiments of the invention.

In one or more embodiments of the invention, the connection graph repository (142) is configured to store one or more connection graphs. FIG. 2 shows an example depiction of a connection graph (299) in accordance with one or more embodiments of the invention. As shown in FIG. 2, the connection graph (299) has multiple components including nodes representing accounts of the messaging platform (100) (i.e., Account A (200), Account B (202), Account C (204), Account D (206), Account E (208), Account F (210), Account G (212)) and edges connecting the various nodes.

The connection graph (299) is a data structure representing relationships (i.e., connections) between one or more accounts. The connection graph (299) represents accounts as nodes and relationships as edges connecting one or more nodes. A relationship may refer to any association between the accounts (e.g., following, friending, subscribing, tracking, liking, tagging, and/or etc.). The edges of the connection graph (299) may be directed and/or undirected based on the type of relationship (e.g., bidirectional, unidirectional), in accordance with various embodiments of the invention.

In one or more embodiments of the invention, the content discovery module (150) includes functionality to identify a context account. The context account can be any account associated with and/or relevant to a request for content. In one example, the context account is an account of a user for which content is requested. In another example, the context account is an account or authoring account of a message from which a link was selected resulting in the request.

In one or more embodiments of the invention, the content discovery module (150) includes functionality to identify a set of initial accounts. The initial accounts can be any set of accounts of the messaging platform (100). For example, the initial accounts can be (i) any arbitrary set of accounts selected randomly from the messaging platform, (ii) all accounts of the messaging platform, (iii) pre-filtered accounts which are tagged prior to receiving a request for content (e.g., top-ranked accounts, non-spam accounts, high-credibility accounts, etc.), (iv) accounts of a certain type (e.g., having a predefined relationship to the context account), (v) a predefined number of most prolific or accounts which have posted content most recently, and/or any other grouping of one or more accounts. For example, the content discovery module (150) can be configured to select initial accounts that are a predefined distance (e.g., 2) from the context account within the connection graph.

In one or more embodiments of the invention, the content discovery module (150) includes functionality to select a set of relevant accounts from among the set of initial accounts. The relevant accounts can be selected based on weighting, scoring, and/or ranking the initial set of accounts according to one or more predefined criteria. The following describes one or more criteria and/or methods for selecting accounts.

In one or more embodiments of the invention, the content discovery module (150) includes functionality to weight each of one or more initial accounts based at least on an account attribute of the initial account. Examples of an attribute of an account can include, but are not limited to, demographic information of a user of the account (e.g., income, gender, age, etc.), display name, user name (e.g., an account handle), number of uni-directional connections (e.g., followers, fans, etc.), number of bi-directional connections (e.g., friends, colleagues, co-workers, etc.), popularity, credibility, spam rating, and/or any other attribute associated with at least one account. In one or more embodiments of the invention, the content discovery module (150) is configured to select accounts having an attribute that meets a predefined threshold. For example, the content discovery module (150) can select accounts having greater than 200 followers, accounts having a spam rating that is less than a predefined maximum rating, accounts meeting a predefined popularity metric (e.g., minimum amount of engagement/views/clicks/fans per time period and/or in aggregate), and/or accounts created prior to a predefined date/time.

In one or more embodiments of the invention, the content discovery module (150) includes functionality to weight the initial accounts based at least on an attribute of the context account. In one or more embodiments of the invention, the content discovery module (150) can be configured to match an attribute of the context account to one or more of the initial accounts sharing the attribute and/or having a relevance to the attribute. For example, if the attribute of the context account includes demographic data indicating that an age of the account's user is 24, the content discovery module (150) can be configured to weight the initial accounts according to their degree of difference from the demographic age of 24. In other words, accounts having a demographic age that differs from the context account can be weighted lower than those having a matching demographic age (e.g., or can be weighted, e.g., linearly or logarithmically, lower in proportion to the difference in demographic age). Any other attribute of the context account can be similarly weighted, in accordance with various embodiments of the invention.

In one or more embodiments of the invention, the content discovery module (150) includes functionality to weight the initial accounts based at least on a proximity of the initial account to the context account within a connection graph. In one or more embodiments, proximity within the connection graph refers to a minimum number of edges connecting two accounts within the connection graph. The content discovery module (150) can be configured to ignore one or more connection types and/or account types when calculating proximity. In one example, "fan" or "subscriber" relationships between user accounts and business accounts can be ignored. In another example, the content discovery module (150) only includes uni-directional edges in proximity calculation when the relationship originates at the context account. For example, an edge representing a follower relationship originates at a "following" account and arrives at a "followed" account. In the example of FIG. 2, given that account A (200) is the context account and account E (208) is one of the initial accounts, the proximity from account A (200) to account E (208) is 2. In another example, given that the content discovery module (150) is configured to include only uni-directional relationships if they are directed from the context account and towards the initial account, the proximity from account E (208) to F (210) is 2.

In one or more embodiments of the invention, the content discovery module (150) includes functionality to weight the initial accounts based on a popularity rating. Examples of a popularity rating can include, but are not limited to, a number of followers/connections/friends of an account, a number of mentions of the account within messages of the messaging platform (100) within a predefined time period, ratio of followed to follower accounts of an account, a connection velocity of the account (e.g., a rate/number of new followers of the account), a number of links referencing a URL associated with the account within messages of the messaging platform within a predefined time period, a number of engagements with content posted by the account within a predefined time period, a percentage of engagement to posted content within a predefined time period, a number of page views of a profile page of the account within a predefined time period, a number of searches associated or referencing the account within a predefined time period, a number of external references (e.g., URLs linking back) to a profile page of the account, and/or any combination of one or more criteria for estimating popularity. In one or more embodiments, the higher the popularity rating of an account, the more heavily it is weighted and, thus, the more likely it is to be selected for inclusion in the final result set. The final popularity rating of the account can be calculated based on a mathematical function of any number of the aforementioned popularity ratings. For example, the number of followers of multiple initial accounts may be normalized as a popularity rating. Each account's popularity rating can then be used by the content discovery module (150) to weight an aggregate score of the account. In this example, the content discovery module (150) can select the accounts having the highest aggregate scores for inclusion in a result set. In another embodiment, the content discovery module (150) is configured to weight and select initial accounts in a single pass analysis without calculating individual scores (e.g., by maintaining a rolling list of highest popularity accounts as the analysis is performed).

In one or more embodiments of the invention, the content discovery module (150) includes functionality to weight the initial accounts based on engagement. An engagement rating can be calculated or identified for each account and can be used to weight the account accordingly for purposes of selecting accounts. Examples of an engagement rating can include, but are not limited to, a number of favorites of the messages broadcasted by the account within a predefined time period (e.g., within the last week), a number of replies to content broadcasted by the account within a predefined time period, a number of views of content associated with the account within a predefined time period, a number of in-message interactions (e.g., playback of a video, expansion to view details of a message, etc.) of messages broadcasted by the account within a predefined time period, a number of unique visitors to the account's profile page, a number of re-broadcasts of messages of the account, an average number of views per message of the account, an average number of visitor views per message of the account, and/or any other measure of user engagement associated with the account. The content discovery module (150) can be configured to select a subset of the initial accounts for inclusion in a result set of accounts based at least partly on the engagement ratings of the accounts. Thus, accounts with a higher engagement rating can be weighted more heavily and, thus, more likely to be included in the result set.

In one or more embodiments of the invention, the content discovery module (150) includes functionality to weight the initial accounts based on one or more whitelists and/or blacklists of accounts. The blacklist of accounts can include accounts designated as being associated with spam, adult content, violating a user agreement, and/or otherwise flagged for restriction according to one or more embodiments of the invention. Thus, for example, the content discovery module (150) can be configured to exclude any account identified in the blacklist. In another example, the content discovery module (150) restricts accounts associated with adult content (based on being flagged in a blacklist of adult accounts) to context accounts of adult users. Thus, in this example, the content discovery module (150) excludes the adult accounts from the analysis and/or result set for requests associated with a non-adult account. A whitelist of accounts can include a privileged, pre-authorized, or otherwise positively flagged set of accounts. In one or more embodiments, a whitelist can further include a whitelist rating, and the content discovery module (150) can be configured to positively weight the accounts identified by the whitelist according to their rating. For example, known partner accounts, news accounts, artist accounts, advertiser accounts, and/or other verified accounts can be flagged in the whitelist and weighted more heavily in the selection of accounts (e.g., by a predefined amount, according to a specified rating, etc.). The blacklist and/or whitelists can also include a rating intended to weight the corresponding accounts. For example, the blacklist can identify high-risk accounts and an associated spam rating corresponding to each high-risk account. Thus, in this example, the content discovery module (150) can weight each account identified in the blacklist inversely according to its spam rating.

In one or more embodiments of the invention, the content discovery module (150) includes functionality to weight the initial accounts based on embedded content metadata. Embedded content can include one or more widgets, scripts, and/or code modules embedded within one or more external data sources and/or web pages. For example, one or more html tags can identify an account of the messaging platform (100) in an external web page (e.g., the html tags may be used, for example, to enable the messaging platform (100) to identify and extract rich media content from the web page). In this example, these tags, and other metadata (either internal and/or external to the messaging platform (100)) are aggregated as a reference rating for one or more referenced accounts. In one or more embodiments, the content discovery module (150) is configured to positively weight one or more initial accounts based on their respective reference ratings such that a higher reference rating increases the likelihood that the account is selected for inclusion in the result set.

In one or more embodiments of the invention, the content discovery module (150) includes functionality to weight the initial accounts based on number of connections. The content discovery module (150) can be configured to select the accounts having the greatest number of connections, and/or to otherwise weight the number of connections of the account in determining which initial accounts to select for inclusion in a result set. The content discovery module (150) can further be configured to weight one or more different types of connections. For example, the content discovery module (150) can weight the initial accounts based on a number of followers of each initial account. In another example, the content discovery module (150) can weight the initial accounts based on a number of uni-directional and/or bi-directional connections (e.g., fans, subscribers, and friends). Any type or combination of connection types can be weighted separately or together in accordance with various embodiments of the invention.

In one or more embodiments of the invention, the content discovery module (150) includes functionality to weight the initial accounts based on a ratio of followers (i.e., follower accounts) to followed accounts. Any other type of uni-directional connection type can also be used, in accordance with various embodiments. Thus, for example, the content discovery module (150) can be configured to calculate a ratio of subscribers of the account to subscribed to accounts. The content discovery module (150) can be configured to positively weight the ratio of one or more initial accounts in the selection of a result set from among a set of initial accounts. Thus, in this example, the accounts having a higher ratio are more likely to be included in the result set than those having a lower ratio based on the formula and/or selection method used.

In one or more embodiments of the invention, the content discovery module (150) includes functionality to weight the initial accounts based on one or more trends. The content discovery module (150) can be configured to identify and/or calculate one or more trends ratings for one or more of the initial accounts. In one or more embodiments of the invention, the content discovery module (150) is configured to weight one or more initial accounts based on their trend rating(s) when selecting accounts for inclusion in the result set. Examples of a trend rating can include, but are not limited to, a mention velocity (e.g., a number of current mentions of the account among messages, a rate of increase in mentions of the account among messages), a value indicating that the account is among a top percentage of mentioned/searched for/followed accounts within a predefined time period, an unfollow rating representing a number of accounts removing a graph connection to the account, an unfollow rating representing a rate at which accounts have removed graph connections to the account within a predefined time period (e.g., within the last 24 hours), an aggregate amount or representative value of engagement (e.g., rebroadcasts, favorites, etc.) with a set of messages authored by the account, and/or any other criteria for distinguishing among accounts and/or messages based on trends.

In one or more embodiments of the invention, the content discovery module (150) includes functionality to weight the initial accounts based on a spam rating and/or flag. In one or more embodiments, the spam rating is a numerical value representing a probability that a given message includes spam and/or a percentage of spam indicators identified within content associated with the account. In one or more embodiments, the content discovery module (150) is configured to weight the initial accounts by a predefined amount in response to determining that a spam flag is present and/or to weight the initial accounts according to the spam rating such that the likelihood of selecting the account for inclusion in the result set is inversely related to the spam rating (e.g., a higher spam rating makes it less likely that the account is selected).

In one or more embodiments of the invention, the content discovery module (150) includes functionality to weight the initial accounts based on identifying promoted accounts. The content discovery module (150) can be configured to positively weight promoted accounts by a predefined rating amount and/or to select at least a predefined number of promoted accounts for inclusion in the result set. Examples of a promoted account may include, but are not limited to, an account for which an advertiser has paid to promote content (e.g., a message/ad/account) on the messaging platform (100), an account which is promoted by an editor/administrator of the messaging platform (100), a partner account which is promoted as part of a partnership agreement, an account tagged for promotion, an account associated with content tagged for promotion, and/or any combination thereof. In one or more embodiments of the invention, the content discovery module (150) is configured to identify and/or create a flag representing one or more promoted accounts and to weight those accounts by a predefined amount based on the flag. In one or more embodiments, the content discovery module (150) is configured to identify and/or calculate a promoted rating for one or more accounts, the promoted rating representing a promotional significance of the account. The content discovery module (150) can be configured to positively weight the account(s) based on their corresponding promotional rating in the selection of a result set from among a set of initial accounts.

In one or more embodiments of the invention, the content discovery module (150) includes functionality to weight the initial accounts based on cashtags. A cashtag can be any token or string of text identifiable as being associated with finance. In one or more embodiments, cashtags are identified based on a character prefix, such as '$'. For example, the content discovery module (150) can be configured to detect that the cashtag "$DJI" refers to a stock ticker symbol for the Dow Jones Industrial Average. The content discovery module (150) can be configured to categorize accounts associated with specific cashtags and/or based on a general finance category by identifying content posted by each account and identifying cashtags. The content discovery module (150) can categorize the accounts based on a frequency of specific and/or general cashtags within the account's content history. In one example, the content discovery module (150) determines that if the account has posted at least 5 messages containing cashtags within the preceding week, the account is flagged as belonging to a finance category. The content discovery module (150) then weights this account more heavily, based on the flag, when performing one or more searches for finance-related content. In one or more embodiments of the invention, the content discovery module (150) is configured to flag the context account as being associated with finance and/or one or more specific cashtags based on a content history of the context account. The content discovery module (150) can be configured, for context accounts associated with finance and/or specific cashtags, to weight finance-related initial accounts and/or initial accounts flagged as being related to those cashtags more heavily (e.g., by a predefined amount) when selecting initial accounts for inclusion in a result set.

In one or more embodiments of the invention, the content discovery module (150) includes functionality to weight the initial accounts based on temporal data associated with one or more accounts. Temporal data can include, but is not limited to, a time of day, a current season, a future time associated with a request for content (e.g., assuming the content is intended for future presentation to a user), and/or any other time-related data usable in the identification of content from the messaging platform (100). For example, the content discovery module (150) can be configured to weight finance/cashtag related accounts and/or messages more heavily during business hours (or during trading hours of a financial exchange) than during non-business (or non-trading) hours. In one or more embodiments, the content discovery module (150) positively weights these accounts by a predefined amount during business hours (or trading hours) and does not positively weight the accounts during non-business (or non-trading) hours. In one example, the content discovery module (150) is configured to identify accounts associated with events occurring at a predefined time (e.g., accounts associated with a public holiday, tax preparation accounts associated with the income tax filing deadline of a particular tax jurisdiction, accounts associated with a publicized event such as a concert or other entertainment event, etc.). In this example, the content discovery module (150) is configured to weight these accounts more heavily within a predefined time period of the event. In other words, the content discovery module (150) identifies a timing associated with the event (e.g., a date/duration or a point in time) and a predefined time window for weighting accounts. Upon detecting that the current time is within the predefined time window of the time associated with the event, the content discovery module (150) is configured to identify accounts associated with the event and to positively weight those accounts during content discovery.

In one or more embodiments of the invention, the content discovery module (150) is configured to weight the accounts based on a proximity to a timing of the event. As the timing of the event approaches, the content discovery module (150) weights the accounts associated with that event more and more heavily until the event occurs. Similarly, after the event has occurred, the content discovery module (150) can be configured to weight the events less and less as proximity to the timing of the event increases. In one or more embodiments, the content discovery module (150) is configured to weight the accounts based on a mathematical function of the proximity to the timing of the event. In one example, the content discovery module (150) is configured to use the following function: $W=1+N/(1+p)$, for $0<p<=48$, where W is the weighting amount, N is a constant $>0$, and p is the proximity in hours from the event. In this example, the content discovery module (150) weights the account associated with the event by the weighting amount W.

In one or more embodiments of the invention, the content discovery module (150) includes functionality to weight the initial accounts based on recency. Recency of a message can refer to a length of time that has elapsed since the message was broadcasted by the messaging platform (100). Recency of an account can refer to a length of time since the last message authored by the account was broadcasted by the messaging platform (100), a length of time since a user of the account last logged in to the account, a length of time since a user of the account viewed predefined content from the messaging platform (100), a number of logins of the account within a predefined elapsed time period (e.g., the prior month), and/or any other metric or combination of metrics for measuring recent activity associated with the account. The content discovery module (150) can be configured to weight more recent accounts/messages more than less recent accounts/messages. For example, the weighting can be a linear, logarithmic, exponential or other function of the recency of an account.

In one or more embodiments of the invention, the content discovery module (150) includes functionality to weight the initial accounts based on identifying one or more events. The content discovery module (150) can be configured to determine a relevance between the accounts and a predefined set of events. Accounts having a relevance (e.g., a relevance score) that exceeds a predefined threshold can be flagged as being relevant to the corresponding event. The content discovery module (150) can then determine a timing of the event(s) and positively weight the relevant accounts during a predefined time period before and/or after the timing of the event(s).

In one or more embodiments of the invention, the content discovery module (150) includes functionality to weight the initial accounts based on one or more interests of the context account and/or initial accounts. The content discovery module (150) can identify interests of accounts (e.g., a set of topics in which a user of the account is deemed to be interested in) based on messages composed by the account, engagement with other messages broadcasted by the messaging platform (100), other accounts connected to the account in the connection graph and the relationship type of those connections (e.g., subscription, fan, follower, friend), a history of visited websites of the account, and any other criteria for determining interest, in accordance with various embodiments. After identifying the interests of the initial accounts and the context account, the content discovery module (150) can be configured to determine a set of accounts most closely matching the interests of the context account. In one or more embodiments, the content discovery module (150) is configured to determine a score indicating an interest alignment between each initial account and the context account. The content discovery module (150) can then positively weight all initial accounts having a score that exceeds a given threshold by a predefined amount.

In one or more embodiments of the invention, the content discovery module (150) includes functionality to weight the initial accounts based on search history. The content discovery module (150) can be configured to compare the search histories of each initial account with a search history of the context account. Any other criteria for aligning search history can be used, in accordance with various embodiments. For example, the content discovery module (150) can calculate a score representing an alignment of the search histories of two accounts. The content discovery module (150) can positively weight all initial accounts having a score that exceeds a given threshold by a predefined amount.

In one or more embodiments of the invention, the content discovery module (150) includes functionality to weight the initial accounts based on a type of device. For example, a "feature phone" device with limited functionality can be weighted less than a "smart phone" device with greater functionality (e.g., Internet access, mobile applications, etc.). In another example, initial accounts associated with devices that are similar to a device used by a user of the context account can be weighted more heavily. In other words, the content discovery module (150) can weight accounts having greater device-related commonality with the context account more heavily than those having less device-related commonality.

In one or more embodiments of the invention, the content discovery module (150) includes functionality to weight the initial accounts based on relevance to identified content. Identified content can include messages associated with the context account and/or messages associated with the initial accounts. For example, the content discovery module (150) can be configured to identify messages engaged with, authored by, and/or viewed by the context account and to determine relevance between those messages and one or more initial accounts. The content discovery module (150) can be configured to use natural language processing in order to calculate a score depicting the relevance based on message content, profile content, and/or engagement content of the initial accounts.

In one or more embodiments of the invention, the content discovery module (150) includes functionality to weight the initial accounts based on visited websites. The visited websites can be, for example, websites visited by a user of the context account and can be identified from a list of uniform resource locators (URLs) or similar set of references. The content discovery module (150) can be configured to weight each of the initial accounts based on a similarity or relevance to the visited websites. Thus, for example, a URL listed on each account's profile page can be compared to the visited websites to determine the relevance. Other attributes of the initial accounts can also be used to determine the relevance, such as, one or more predefined categories/topics associated with the accounts.

In one or more embodiments of the invention, the content discovery module (150) includes functionality to weight the initial accounts based on geographic location. A geographic location associated with one or more of the initial accounts can be identified. For example, geo-tagging data obtained from user-generated content posted by the account can be used to determine the geographic location. Language and/or locale can also be mapped to predefined geographic locations, which the content discovery module (150) can use for weighting the initial accounts. The geographic location(s) can then be compared to a geographic location of the context account to determine a relevance or proximity value. The content discovery module (150) can be configured to weight initial accounts such that accounts having greater proximity are weighted less than accounts having lesser proximity from a geographic location associated with the context account.

In one or more embodiments of the invention, the content discovery module (150) includes functionality to weight the initial accounts based on social proximity. Social proximity can refer to a distance between two or more accounts within the connection graph. For example, the content discovery module (150) can calculate a social proximity between one or more of initial accounts and the context account. In another example, the content discovery module (150) is configured to identify accounts engaging with content generated by the initial accounts and to calculate a social proximity between the engaging accounts and the context account. When comparing multiple accounts with the context account, the social proximity can be a number representing a mean, median, or other representative distance in the connection graph. The content discovery module (150) can be configured to weight accounts associated with lower social proximity values more heavily than accounts associated with higher social proximity values.

In one or more embodiments of the invention, the content discovery module (150) includes functionality to identify one or more graph-based relationships between the context account and one or more initial accounts. The graph-based relationships can include, but are not limited to, connection types in common, shortest distance, common followers/followees/friends/etc., engagement level with other accounts, and any other type of association between two accounts in a connection graph.

In one or more embodiments of the invention, the content discovery module (150) includes functionality to weight the initial accounts based on affinity with one or more connecting accounts (e.g., a context account). The content discovery module (150) may be configured to use one or more of the graph-based relationships between a context account and one or more initial accounts to determine the affinity. A relationship can be any association or attribute of two or more accounts. For example, the content discovery module (150) can be configured to identify a path in the connection graph between the context account and an initial account. Based on a number of edges in the path and/or based on any number of shared attributes between the two accounts, the content discovery module (150) can be configured to calculate an affinity score representing an affinity of the context account to the initial account. Affinity can refer, for example, to a numerical or other value representing one or more relationships between two accounts and/or one or more attributes shared between two accounts. Thus, for a first account A following or otherwise connected to a second account B, affinity can be calculated as a number of times within a predefined time period that account A has engaged with content produced by account B. In another example, the affinity value of a given account A relative to a connected account B can be calculated as a number of common followed accounts (e.g., accounts followed by both account A and account B). Many other methods/formulas/values can be used to calculate affinity, in accordance with various embodiments of the invention. The content discovery module (150) can be configured to weight the initial accounts based on the calculated affinity (e.g., ranking the accounts in order of their affinity scores, weighting the accounts based on their affinity scores, etc.).

In one or more embodiments of the invention, the content discovery module (150) includes functionality to weight the initial accounts based on language and/or locale. Accounts having a common locale/language with the context account can be weighted more heavily than accounts having different locales/languages.

In one or more embodiments of the invention, the content discovery module (150) includes functionality to select one or more initial messages authored by (and/or otherwise associated with) the set of relevant accounts. Messages, like accounts, can also be weighted, scored, ranked, and/or selected based on any number of weighting criteria. The selection of accounts and messages can be performed serially and/or in parallel according to various embodiments. In a first example, the content discovery module (150) first selects a predefined number of accounts and then selects messages from those accounts. Thus, the content discovery module (150) can be configured to identify a result set of accounts and/or a result set of messages based on different weighting criteria. Furthermore, in one or more embodiments, the content discovery module (150) can be configured to select a maximum number of messages from each of the identified accounts, such that the result set of messages is not monopolized by a single account. For example, the content discovery module (150) can be configured to select X number of accounts, and then the most recent Y number of initial messages posted by each of the X accounts. Among the Y initial messages, the content discovery module (150) can then select a subset of the messages by ranking and selecting the messages according to the weighting criteria disclosed herein (and, optionally, further limited by the maximum number of selected messages per account). The initial messages can include only messages authored by the set of relevant authors, messages authored or rebroadcasted by the set of relevant authors, and/or messages otherwise associated with the set of relevant authors, in accordance with various embodiments of the invention.

In one or more embodiments of the invention, the content discovery module (150) includes functionality to weight the initial messages based on recency (e.g., recency of posting to the messaging platform (100)). More recent messages can be weighted more heavily than less recent messages, according to preselected weighting amount(s)/criteria.

In one or more embodiments of the invention, the content discovery module (150) includes functionality to weight the initial messages based on popularity. Popularity can refer to popularity of the authoring account of the message, popularity of the message itself (e.g., based on views, engagement, shares of the message, and etc.), and/or any combination thereof. More popular messages can be weighted more heavily than less popular messages, according to preselected weighting amount(s)/criteria.

In one or more embodiments of the invention, the content discovery module (150) includes functionality to weight the initial messages based on engagement. Examples of message-related engagement includes, but are not limited to, a number of favorites, replies, views, shares, in-message interaction (e.g., playback), and any other relevant metric for quantifying engagement associated with a message. The content discovery module (150) can be configured to weight messages with higher engagement more heavily than messages with lower engagement, according to preselected weighting amount(s)/criteria.

In one or more embodiments of the invention, the content discovery module (150) includes functionality to weight the initial messages based on embedded message metadata. For example, message metadata can include information associated with the message such as user interface selections, embedded code, conversation information (e.g., reference(s) to a parent/child message or other component of a conversation tree, and any other metadata associated with a message. Thus, messages within a popular conversation can be weighted more heavily than other messages. Message-related metadata can also include metadata included in one or more external locations, such as, metadata from an external web page. The content discovery module (150) can be configured to aggregate this metadata and to weight the messages according to the aggregated data. For example, messages referenced from a large number (e.g., a threshold number) of spam or adult-content related websites can be negatively weighted by the content discovery module (150).

In one or more embodiments of the invention, the content discovery module (150) includes functionality to weight the initial messages based on trends. A trend can be any indication of an increase in activity associated with content in the messaging platform (100). Topics, keywords, hashtags, usernames, images, video, and/or any other content can be analyzed for trends. For example, a baseline activity amount can first be calculated/identified. The baseline can represent any historical amount of the activity (for purposes of comparison). A current activity amount representing current or more recent activity than the baseline can then be calculated and compared to the baseline amount. If the current activity amount exceeds the baseline by at least a predefined threshold percentage or amount, the content discovery module (150) can be configured to designate the content as trending. Thus, the content discovery module (150) can be configured to positively weight messages including trending content and/or negatively weight messages including negatively trending content (where negatively trending content indicates a decrease in activity associated with the content).

In one or more embodiments of the invention, the content discovery module (150) includes functionality to weight the initial messages based on spam criteria. Messages can be assigned a spam score reflecting a likelihood of the message being associated with spam. The content discovery module (150) can be configured to weight the initial messages according to their spam score, such that the messages having a higher spam score (i.e., messages more likely to be associated with spam) are weighted more than messages having a lower spam score (i.e., messages less likely to be associated with spam).

In one or more embodiments of the invention, the content discovery module (150) includes functionality to weight the initial messages based on engagement. Various different engagement criteria can be used. For example, the content discovery module (150) can be configured to calculate a ratio of positive interaction (e.g., likes, favorites, etc.) to comments, a ratio of engagement to average engagement for the authoring account, and/or any other engagement metric usable in weighting/selecting/ranking messages for presentation to a user. Messages with a higher ratio of positive interaction to comments can be weighted more heavily than messages with a lower ratio of positive interaction to comments. Similarly, messages with a higher ratio of engagement to average engagement for the authoring account can be weighted more heavily than those with a lower ratio of engagement to average engagement.

In one or more embodiments of the invention, the content discovery module (150) includes functionality to weight the initial messages based on engagement velocity. Engagement velocity is a numerical value representing a rate or amount of change of one or more engagement metrics (e.g., likes, favorites, views, comments, etc.). The content discovery module (150) can calculate or identify one or more engagement velocities associated with the message, and then weight the message according to the engagement velocities. For example, for positive engagement metrics (e.g., likes, favorites, new followers/friends, etc.), the message can be positively weighted proportional to the engagement velocity and for negative engagement metrics (e.g., spam reports, blocks of the message/authoring account, unfollows/unfriends) the message can be negatively weighted proportional to the engagement velocity.

In one or more embodiments of the invention, the content discovery module (150) includes functionality to weight the initial messages based on trending accounts. A trending account can be any account associated with a spike in activity/engagement and/or a high level of activity/engagement. Examples of trending accounts can include, but are not limited to, accounts having a number of mentions exceeding a predefined amount or percentage increase, accounts having an aggregate engagement by other users exceeding a predefined amount or percentage (across multiple messages authored by the account), and any other measure of recent activity/engagement associated with the account. The content discovery module (150) can be configured to determine whether the authoring account of a message is trending and to positively weight the message proportional to a numerical value representing the strength of the trend (or by a predefined amount/percentage).

In one or more embodiments of the invention, the content discovery module (150) includes functionality to weight the initial messages based on promoted content. For example, if the message is a promoted message, the content discovery module (150) can be configured to weight the message positively in one or more predefined promoted geographic regions/advertising spaces.

In one or more embodiments of the invention, the content discovery module (150) includes functionality to weight the initial messages based on cashtags (finance-related symbols, e.g., stock ticker symbols prefixed by a '$' character). For example, the content discovery module (150) can be configured to detect a cashtag in a message and to identify stock exchange associated with the cashtag. The content discovery module (150) can determine trading hours of the stock exchange and then weight the message positively during those trading hours. Other cashtags can be weighted by varying amounts, depending on the finance-related hours identified (e.g., business hours, temporal proximity to an earnings call, temporal proximity to a related event, etc.).

More generally, in one or more embodiments of the invention, the content discovery module (150) includes functionality to weight the initial messages based on a time. Thus, messages including positive content associated with a time can be weighted positively by the content discovery module (150) and messages including negative content associated with a time can be weighted negatively by the content discovery module (150). For example, positive content can include a hashtag associated with an event that has occurred or will occur within a threshold temporal proximity (e.g., within a 1 hour window of the event). In another example, negative content can include a hashtag associated with over-represented content (e.g., an over-represented event or account) within a threshold temporal proximity of an associated event (e.g., within a 1 hour window of a concert/election/etc.).

In one or more embodiments of the invention, the content discovery module (150) includes functionality to weight the initial messages based on events. For example, the content discovery module (150) can be configured to identify event related data, such as timing of an event, description of an event, people associated with an event (e.g., an artist performing at a concert), an account of the messaging platform (100) associated with a relevant person (e.g., an artist account), a location of an event, and/or any other data related to an event. In one or more embodiments, the content discovery module (150) is configured to positively weight accounts and or messages relevant to commonalities between the event data and a set of user data (e.g., a user's location, interests, profile information, connected accounts, etc.). In another embodiment, the content discovery module (150) is configured to positively weight accounts and or messages relevant to commonalities between the event data and global data (e.g., temporal data such as current date/time, trending topics/news/keywords/etc.).

In one or more embodiments of the invention, the content discovery module (150) includes functionality to weight the initial messages based on interest. The content discovery module (150) can be configured to receive a list of interest definitions for an account, or can be configured to determine one or more interests of the account based on content posted/authored by the account, engagement with content posted by other accounts, lists of accounts commonly associated with a predefined or user-defined category, and any other set of data. The content discovery module (150) can analyze these different data sets to determine commonly occurring topics and/or associations and can then classify those topics and/or associations as interests of the context account.

In one or more embodiments of the invention, the content discovery module (150) includes functionality to weight the initial messages based on relevance to search history of the context account. The content discovery module (150) can be configured to perform an analysis of searched terms and phrases of the context account and to positively weight initial messages relevant to those terms/phrases by a predefined amount/percentage. The content discovery module (150) may employ any number of methods of natural language processing, search methods, and/or semantic analysis already known in the art to identify relevance/matching between the initial messages and the search history of the context account. The content discovery module (150) can be configured to then weight the initial message(s) according to their relevance.

In one or more embodiments of the invention, the content discovery module (150) includes functionality to weight the initial messages based on message content. Message content can be matched/compared to content associated with the context account in order to determine a relevancy. The content discovery module (150) can then weight the initial messages according to the calculated relevancy.

In one or more embodiments of the invention, the content discovery module (150) includes functionality to weight the initial messages based on relevance to profile content of the context account. Profile content can include any information associated with a user's profile, including but not limited to, biographical data, gender, location, moods, interests, topics, groups, organizations, employment/educational history, and/or any other relevant information. In one or more embodiments, the profile content can be compared to one or more initial messages in order to determine a relevancy, and the content discovery module (150) can be configured to weight the initial messages according to the calculated relevancy.

In one or more embodiments of the invention, the content discovery module (150) includes functionality to weight the initial messages based on relevance to visited websites of the context account. The content discovery module (150) can be configured to receive a set of identifiers (e.g., uniform resource locators (URLs)) identifying websites (e.g., either top level domains or individual web pages) visited by the context account or a user associated with the context account. The content discovery module (150) can then identify or calculate a relevance between each initial message and (1) the set of visited websites and/or (2) each of the individual websites among the set. The content discovery module (150) can be configured to positively weight the initial messages according to the calculated relevance. For example, the content discovery module (150) can increase the weight of each initial message having a relevance exceeding a threshold by a predefined amount. In this example, the content discovery module (150) can further assign different predefined positive weights to the initial messages according to a recency of one or more visits to the relevant website.

In one or more embodiments of the invention, the content discovery module (150) includes functionality to weight the initial messages based on uniform resource locator (URL) metadata. Examples of URL metadata can include, but are not limited to, domain quality, page title, page snippet, page image, and/or any other information associated with a URL. The content discovery module (150) can be configured to obtain the URL metadata from the website referenced by a URL and/or from a third party data source. The URL associated with the URL metadata can be, for example, a URL included within the message, a URL identified in a set of websites visited by the context account, and/or any URL usable in determining content relevancy. The content discovery module (150) can be configured to use URL metadata to determine relevance to one or more of the initial messages (e.g., based on page title, metadata tags, etc.) and/or other criteria usable in weighting the initial messages (e.g., a domain quality score).

In one or more embodiments of the invention, the content discovery module (150) includes functionality to weight the initial messages based on a mature content rating. One or more of the messages can be assigned a mature content rating. The mature content rating can indicate that the message includes mature content or can represent a probability of the message including mature content. The content discovery module (150) can be configured to exclude initial messages having mature content or a high probability of mature content from the result set based, for example, on preferences of the context account (e.g., a mature content filter setting).

In one or more embodiments of the invention, the content discovery module (150) includes functionality to weight the initial messages based on geographic location. The content discovery module (150) can be configured to identify location information associated with each message. The location information can be identified based on geotagged content associated with a message, location information associated with an authoring account of the message, or any other data indicating a location associated with the message. In one or more embodiments, the content discovery module (150) identifies location information associated with the context account and performs a comparison of the location information of the context account with location information associated with the messages. The content discovery module (150) can be configured to rank the initial messages according to their proximity to the location of the context account (e.g., by calculating a proximity score representing a proximity to the location of the context account). The content discovery module (150) can then weight the initial messages according to their proximity to the context account such that messages with a lower proximity are more likely to appear in the result set than those with a higher proximity.

In one or more embodiments of the invention, the content discovery module (150) includes functionality to weight the initial messages based on language. Initially, the content discovery module (150) can be configured to determine or identify a language or primary language associated with the context account. The content discovery module (150) can then identify a language associated with each of the initial messages (e.g., by detecting a language of the message text or by obtaining a language of the authoring account) and then compare that language with the language of the context account. In one or more embodiments, the content discovery module (150) is configured to positively weight those initial messages having a language that matches the language of the context account and/or negatively weight initial messages having a language that differs from the language of the context account.

In one or more embodiments of the invention, the content discovery module (150) includes functionality to perform query-dependent and/or query-independent content discovery. Thus, for example, the content discovery module (150) can be configured to pre-select relevant content according to a periodic time schedule. Furthermore, in one or more embodiments, query-independent content discovery can be based on the activity level of each account (e.g., average number of logins per time period, average amount of engagement per time period, average number of clicks per time period, number of views per month, etc.). For example, the content discovery module (150) can be configured to identify and store relevant content query-independently for "active" accounts. In this example, the content discovery module (150) identifies any account having more than 1 average login per week as an active account. Continuing the example, the content discovery module (150) identifies and stores discovered content in the discovery repository (148) for the active accounts periodically. The content discovery module (150) can then perform query-dependent content discovery for all non-active accounts (e.g., content discovery can be performed in response to a request for relevant content).

In one or more embodiments of the invention, the discovery repository (148) includes functionality to store discovery content (e.g., identified accounts, messages, multimedia, metadata, etc.). The discovery repository can be implemented as a component of the messaging platform (100) as shown in FIG. 1, and/or can include one or more client-side components (e.g., on the client (105)), in accordance with various embodiments. In one or more embodiments, some or all discovery content is cached on the client (105) and is updated periodically and/or on-demand. For example, a set of identifiers of relevant accounts and/or messages can be stored the client and updated periodically. The content discovery module (150) can, for example, identify accounts based on relevance to a context account (e.g., an account registered to a user of the mobile device) and can provide identifiers of the accounts to the client (105) for storage/update on the client (105). Continuing the example, the client can then request discovery content for display to the user either on-demand or periodically.

In one or more embodiments of the invention, the content discovery module (150) includes functionality to receive a request for content. The request can be for any type of content and can include or be associated with an identifier of a context account (e.g., the requesting account). For example, a client can request messages of a messaging platform that may be interesting and/or relevant to a user of the messaging platform. These may include messages outside of the user's immediate connections within a connection graph. In this way, user's can be exposed to content irrespective of proximity in the connection graph (although the connection graph can be used as a signal to increase relevance). The content discovery module (150) can be configured to identify initial messages and then weight the messages according to any number of predefined criteria in order to select a result set of messages for presentation to the user. Alternatively or concurrently, the content discovery module (150) can be configured to identify initial accounts of the messaging platform and to weight the accounts according to any number of predefined criteria in order to select a result set of accounts. The content discovery module (150) can then select one or more messages from account in the result set for presentation to the user and/or can present information associated with one or more accounts from the result set to the user (e.g., a profile page of the account).

In one or more embodiments of the invention, the content discovery module (150) includes functionality to identify relevant content based on messages and/or accounts of the messaging platform (100). In one or more embodiments, the content discovery module (150) can be configured to identify a content type (e.g., uniform resource locators (URLs), images, news URLs, hashtags, search terms, advertisements, etc) for recommendation to a user by using the processes described above with regard to initial accounts/messages (and/or the processes described with regard to FIGS. 3, 4A, and 4B, below) modified to select only messages including the content type. In one example, a user enters one or more search terms into a client application. In this example, the content discovery module (150) performs the process of FIGS. 3, 4A, and 4B (described below) modified to select only messages including the terms entered by the user. The content discovery module (150) returns a result set which is displayed to the user in the client application. The client application can further be configured to receive data associated with accounts, messages, and/or content. For example, the client application may receive engagement data associated with each identified message (e.g., a number of times a message has been shared, favorited, liked, viewed, etc.) and/or relevant account. The client application can be configured to display an indication of the associated data with the relevant content, message(s), and/or account(s) in a user interface. In this way, any data used to identify relevant accounts, messages, and/or content can be displayed to the end user by the client device. This associated data can include, for example, any of aforementioned weighting criteria or inputs associated with weighting criteria, in accordance with various embodiments of the invention. See, for example, indication 501, 502, and 504 of FIG. 5.

In one or more embodiments of the invention, the content discovery module (150) includes functionality to provide the messages, accounts, URLs, images, and/or associated content in response to a content request.

In one or more embodiments of the invention, the routing module (125) includes functionality to receive one or more messages and to store the messages in the message repository (140). The routing module (125) can be configured to assign an identifier to the message and to notify the graph fanout module (130) of a sender of the message.

In one or more embodiments of the invention, the graph fanout module (130) includes functionality to retrieve graph data from the connection graph repository (142) and to use the graph data to determine which accounts in the messaging platform (100) should receive the message. The graph data, for example, can reflect which accounts in the messaging platform are "following" a particular account and are, therefore, subscribed to receive status messages from the particular account.

In one or more embodiments of the invention, the delivery module (135) includes functionality to receive a list of accounts from the graph fanout module (130) and the message identifier generated by the routing module (125) and to insert the message identifier into stream data associated with each identified account. The delivery module (135) can then store the message list in the stream repository (144). The stream data stored in the stream repository (144) can make up one or more streams associated with one or more accounts of the messaging platform (100). A stream may be a dynamic list of messages associated with one or more accounts or can reflect any arbitrary organization of messages that is advantageous for the user of an account.

In one or more embodiments of the invention, the content discovery module (150) is a software application or a set of related software applications configured to execute on one or more hardware processors. The content discovery module (150) can include one or more reader threads configured to perform multiple concurrent searches/analysis of data in one or more repositories (e.g., 140, 142, 144, 146, 148) of the messaging platform. The content discovery module (150) can be a component of a service-oriented architecture (SOA) or any other software platform, either inside or outside of the messaging platform (100), in accordance with various embodiments. In one or more embodiments of the invention, one or more components of the content discovery module (150) reside in a cloud computing application in a network distributed system. In one or more embodiments of the invention, content discovery module (150) is integrated within or operatively connected to one or more other components of the messaging platform (100).

In one or more embodiments of the invention, the content discovery module (150) is configured to perform query-independent functionality associated with content discovery. The query-independent functionality (described herein) can be performed periodically or upon ingesting one or more messages for broadcasting by the messaging platform (100). In one or more embodiments of the invention, the content discovery module (150) is configured to perform query-dependent functionality associated with content discovery.

In one or more embodiments of the invention, the frontend module (110) is a software application or a set of related software applications configured to communicate with external entities (e.g., client (105)). The frontend module (110) can include the application programming interface (API) and/or any number of other components used for communicating with entities outside of the messaging platform (100). The API can include any number of specifications for making requests from and/or providing data to the messaging platform (100). For example, a function provided by the API can provide artist/song recommendations to a requesting client (105).

In one or more embodiments of the invention, the frontend module (110) is configured to use one or more of the data repositories (message repository (140), connection graph repository (142), stream repository (144), discovery repository (148), and/or account repository (145)) to define streams for serving messages (i.e., stream data) to a user of the account on the messaging platform (100). A user can use any client (105) to receive the messages. For example, where the user uses a web-based client to access the messaging platform (100), an API of the frontend module (110) can be utilized to define one or more streams and/or to serve the stream data to the client for presentation to the user. Similarly, different forms of message delivery can be handled by different modules in the frontend module (110). In one or more embodiments of the invention, the user can specify particular receipt preferences, which are implemented by the frontend module (110).

In one or more embodiments of the invention, one or more of the data repositories (message repository (140), connection graph repository (142), stream repository (144), account repository (146), discovery repository (148)) is a database and/or storage service residing on one or more servers. For example, one or more of the data repositories may be implemented as a storage service using service-oriented architecture (SOA) and configured to receive requests for data and to provide requested data to other components of the messaging platform (100). In another example, the message repository (140) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository (140), connection graph repository (142), stream repository (144), account repository (146), discovery repository (148)) is a separate application or set of applications residing on one or more servers external (and communicatively coupled) to the messaging platform (100). Alternatively, in one or more embodiments of the invention, one or more of the data repositories can be an integrated component of the messaging platform (100) and/or can reside, either partially or entirely, on one or more common hardware devices (e.g., a server).

Figure 3:
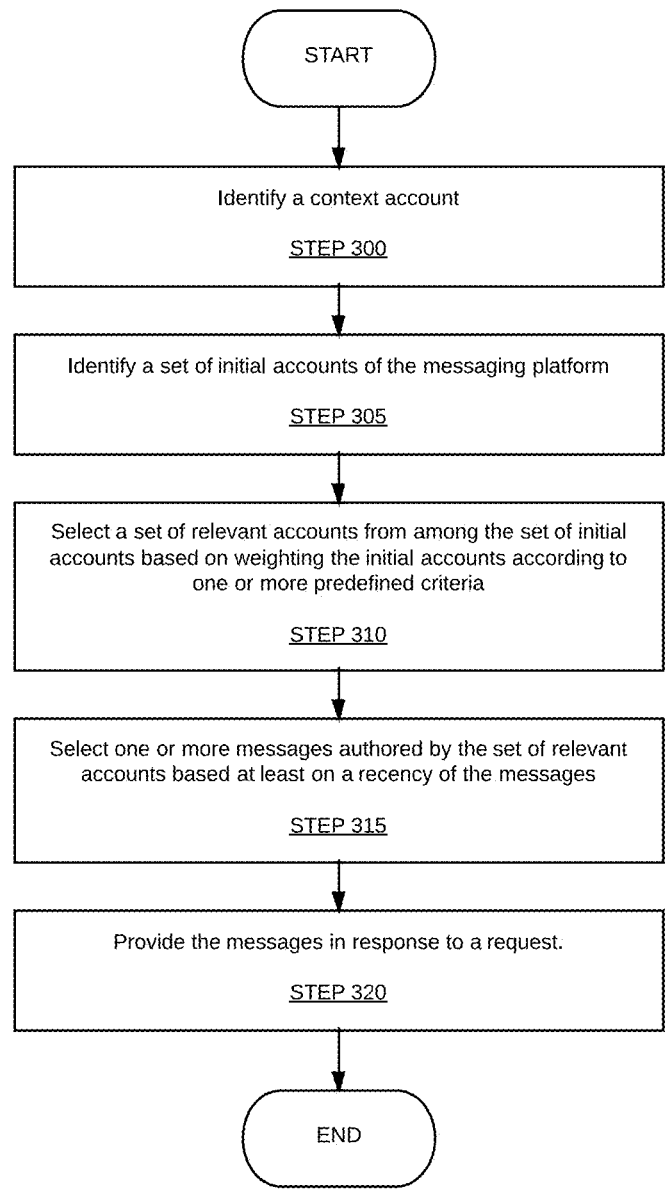
FIGS. 3, 4A, and 4B show flowcharts, in accordance with one or more embodiments of the invention.
Figure 4A:
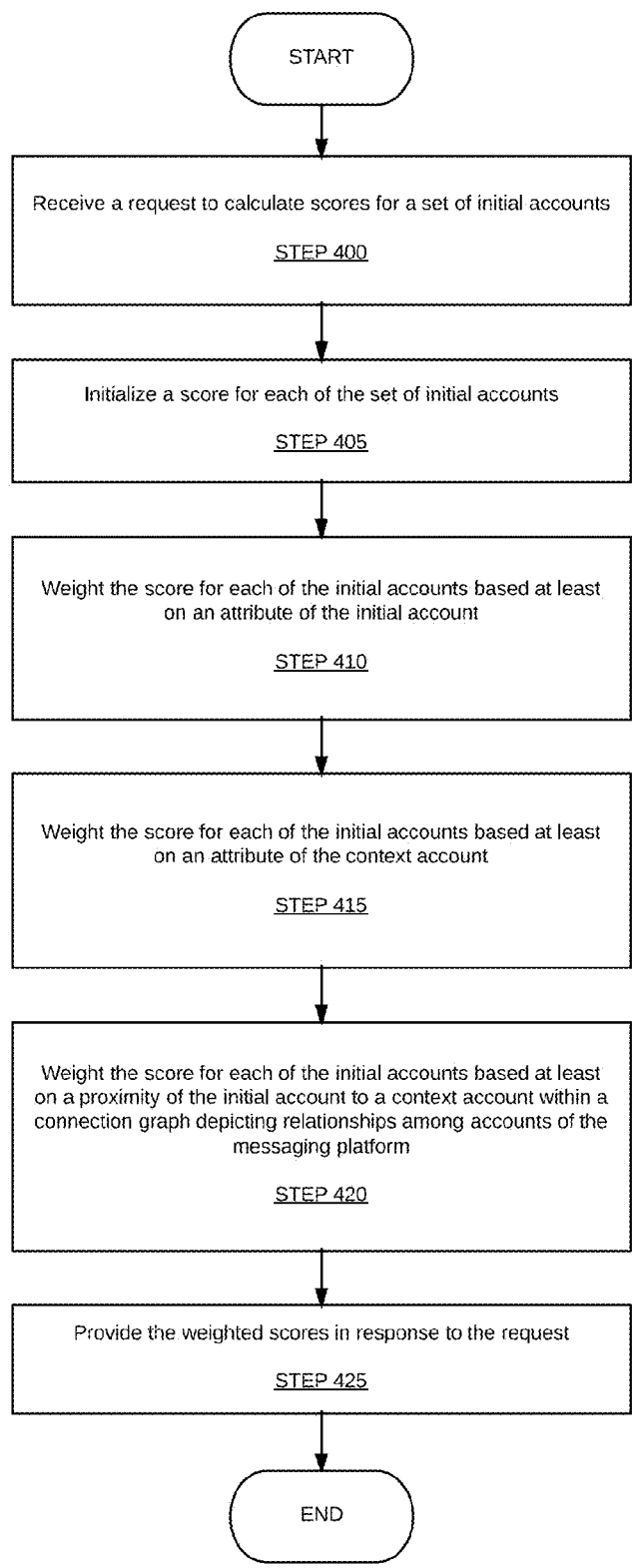
Figure 4B:
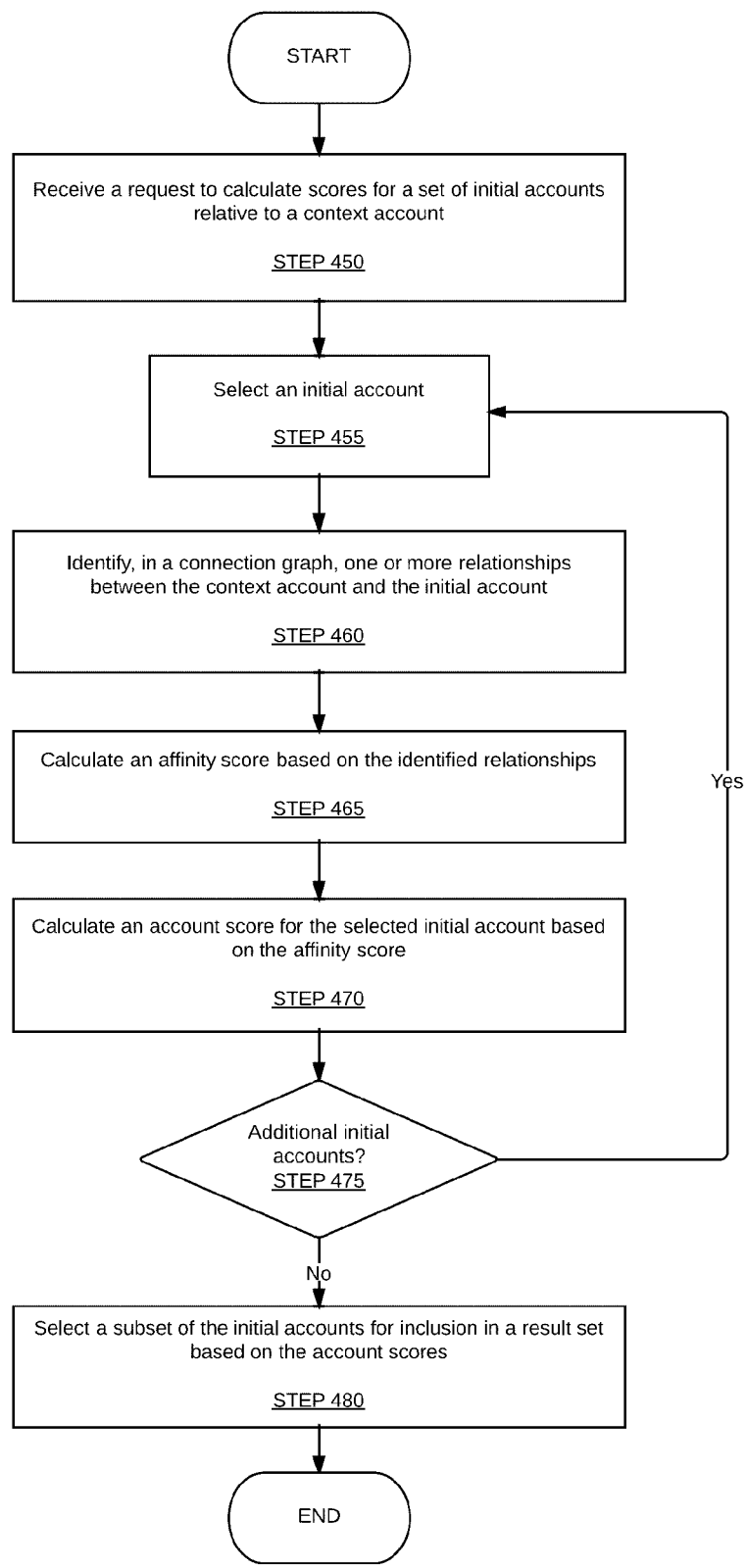

FIGS. 3, 4A, and 4B show flowcharts of methods, in accordance with various embodiments of the invention. While the various steps in these flowcharts are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIGS. 3, 4A, and 4B should not be construed as limiting the scope of the invention.

The steps of FIGS. 3, 4A, and 4B can be performed by a content discovery module (e.g., content discovery module (150) of FIG. 1, discussed above). For example, the steps of FIGS. 3, 4A, and 4B can be used to identify candidate accounts, rank/weight the accounts according to one or more criteria, select a result set of the ranked/weighted accounts, and/or to provide relevant content (e.g., messages authored by the accounts) to a client. In another example, the steps of FIGS. 4A and/or 4B can be used in conjunction with or independent of the steps of FIG. 3 to weight one or more initial accounts by scoring each account and weighting the scores according to one or more criteria. Steps 455-475 of FIG. 4B can be performed serially, in parallel, and/or in combination for any number of initial accounts, in accordance with various embodiments of the invention. Thus, for example, a content discovery module can be configured to calculate affinity scores and/or accounts scores for multiple accounts concurrently. Furthermore, in one or more embodiments of the invention, messages authored or otherwise associated with one or more accounts can be scored, ranked, and/or otherwise selected for display by a client device concurrently with the steps of FIGS. 3, 4A, and/or 4B.

In one or more embodiments of the invention, one or more steps of the flowcharts are repeated concurrently by multiple threads. Thus, one or more of the steps can be performed serially, in parallel, and/or by a distributed system, in accordance with various embodiments of the invention. For example, selecting/weighting/ranking accounts can be performed concurrently with selecting/weighting/ranking messages. In this example, while a first thread (e.g., a thread of a content discovery module) identifies and ranks accounts, a second thread can be configured to weight messages from the identified accounts to select a result set of messages from each account. In one or more embodiments of the invention, the steps of FIGS. 3, 4A, and/or 4B can be re-performed on newly broadcasted messages after a predefined time period has elapsed since receiving a request for content. Thus, for example, a first request for content can be received from a client and a response can be generated using the method(s) of FIGS. 3, 4A, and/or 4B. After a predefined time period has elapsed, the method(s) of FIGS. 3, 4A, and/or 4B can be performed again, this time only identifying messages newly broadcasted since the last request. In this way, new discovery content can be automatically calculated/identified by a server application (e.g., a content discovery module) without an explicit request from the client. The server application can then send the client a set of newly identified messages/content and/or an indication of newly identified messages/content (e.g., a number of newly identified messages). If an indication is sent to the client, the client can be configured to notify a user of the newly identified messages and to receive a request from the user to obtain the new messages from the server application and to display them in the web browser.

Figure 5:
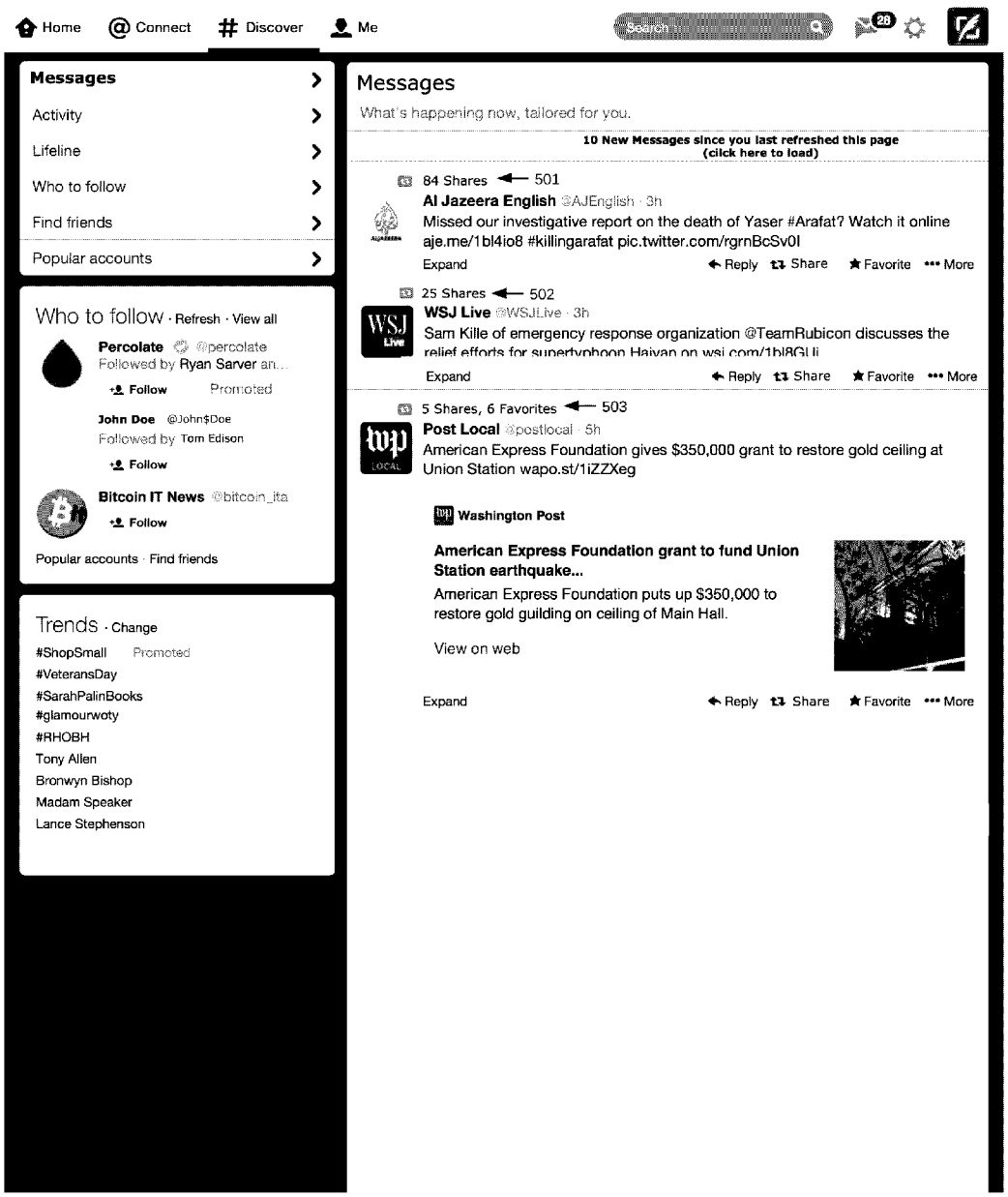
FIG. 5 shows an example user interface, in accordance with one or more embodiments of the invention.

FIG. 5 depicts an example screen shot of a web browser executing on a client computing device. In the example of FIG. 5, a user of a messaging platform clicks a user interface element labeled "# Discover." This initiates a request from the client computing device to an external content discovery module of a server of the messaging platform. The request includes an identifier of the user's account (e.g., the context account of the request). Upon receiving the request, the content discovery module identifies an initial set of accounts and proceeds to weight the initial accounts according to a set of predefined criteria. A final result set of the accounts is selected based on the weighting, and one or more messages authored by the final result set of accounts is provided to the client computing device for display in the web browser. The provided messages are depicted by the client computing device in reverse chronological order of their broadcast time. The client enables the user to refresh the user interface by selecting an indication of new messages (e.g., "10 new messages since you last refreshed this page . . . "), after which newly identified messages are provided by the content discovery module and displayed in the browser window.

Figure 6:
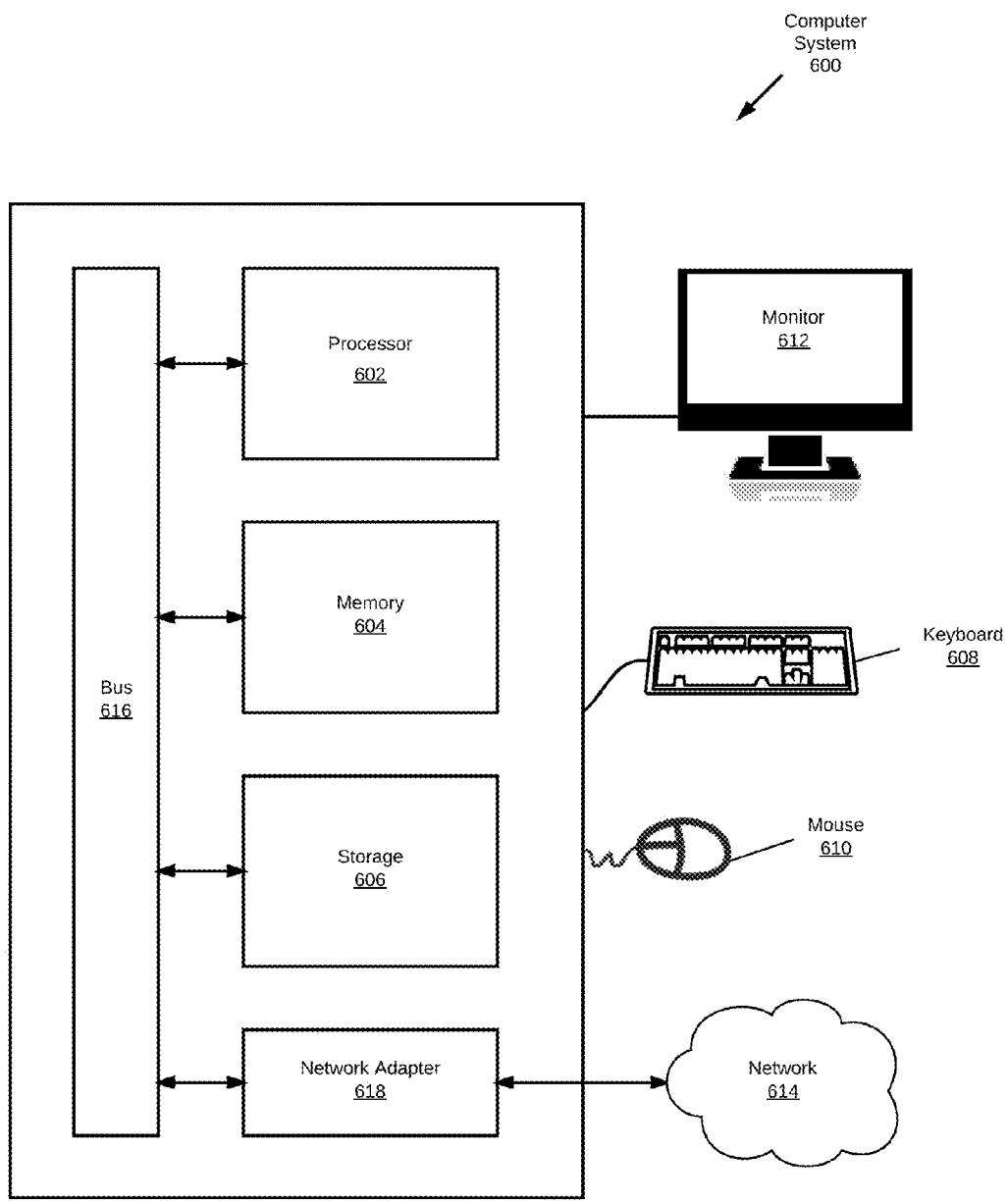
FIGS. 6 and 7 show computer systems, in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, hardware processor, etc.), associated memory (604) (e.g., RAM, cache memory, flash memory, etc.), a storage device (606) (e.g., a hard disk, an optical drive such as a compact disk drive or digital video disk (DVD) drive, a flash memory stick, etc.), a network adapter (618), and numerous other elements and functionalities typical of today's computers (not shown). One or more components of the computer system (600) may be communicatively connected by a bus (616). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via the network adapter (618). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., content discovery module (150), discovery repository (148), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described systems (e.g., content discovery module (150), routing module (125), etc. of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIGS. 3, 4A, and 4B), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 7:
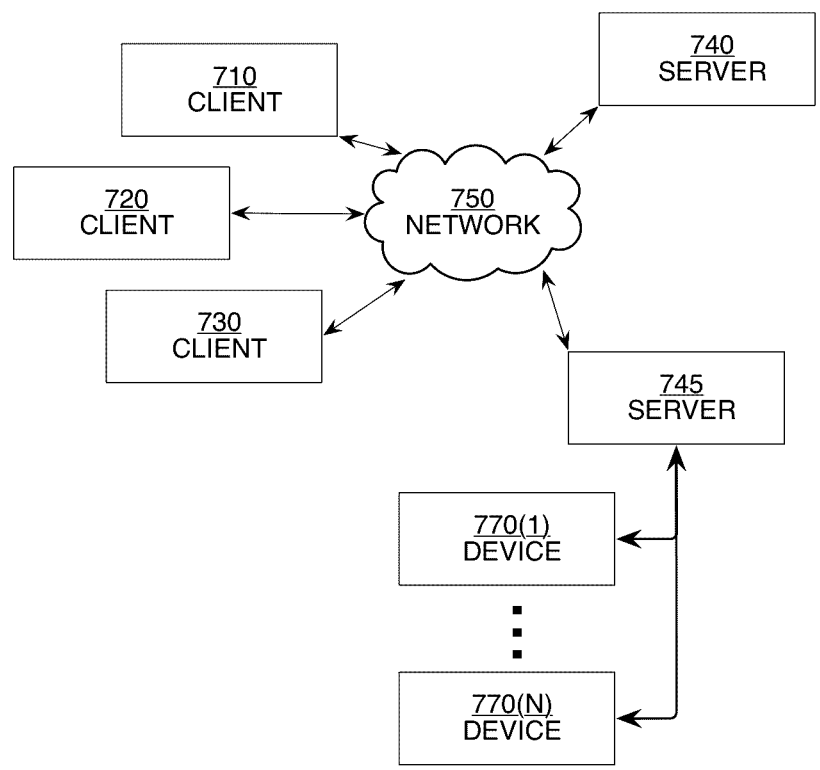

FIG. 7 is a block diagram of an example of a network architecture 799 in which client systems 710, 720, and 730 and servers 740 and 745 may be coupled to a network 750. Client systems 710, 720, and 730 generally represent any type or form of computing device or system, such as clients 127 and 129 of FIG. 1A.

Similarly, servers 740 and 745 generally represent computing devices or systems, such as application servers or database servers, configured to provide various database services and/or run certain software applications (e.g., functionality of content discovery module (150) of FIG. 1, discussed above). Network 750 generally represents any telecommunication or computer network including, for example, an intranet, a wide area network (WAN), a local area network (LAN), a personal area network (PAN), or the Internet.

With reference to computer system 699 of FIG. 6, a communication interface, such as network adapter 618, may be used to provide connectivity between each client system 710, 720, and 730 and network 750. Client systems 710, 720, and 730 may be able to access information on server 740 or 745 using, for example, a Web browser, thin client application, or other client software. Such software may allow client systems 710, 720, and 730 to access data hosted by server 740, server 745, or storage devices 770(1)-(N). Although FIG. 7 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 740, server 745, storage devices 770(1)-(N), or any combination thereof. All or a portion of one or more of the example embodiments disclosed herein may also be encoded as a computer program, stored in server 740, run by server 745, and distributed to client systems 710, 720, and 730 over network 750.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

One or more embodiments of the invention have one or more of the following advantages. By using weighting accounts and/or messages with one or more weighting criteria, it may be possible to surface relevant content from a messaging platform to one or more user accounts. In this way, in one or more embodiments, relevant content can be suggested or provided to one or more users and can be propagated through a network of associated user accounts within a connection graph.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying relevant content from a messaging platform, comprising:
   receiving a message from an account of the messaging platform;
   selecting, in response to receiving the message, a context account when the context account follows the account in a connection graph;
   inserting the message into a stream associated with the context account;
   identifying a set of initial accounts, wherein each account in the set of initial accounts does not have a following relationship with the context account within the connection graph and wherein each of the set of initial accounts is also one selected from a group consisting of a non-spam account, a top-ranked account, and a high-credibility account;

selecting, by a computer processor, a set of relevant accounts from among the set of initial accounts by weighting the set of initial accounts based at least on a first criterion, wherein the first criterion comprises engagement of accounts in the initial set of accounts;

selecting a set of messages authored by the set of relevant accounts based at least on a second criterion, wherein the second criterion comprises engagement involving messages in the set of messages; and inserting the set of messages into the stream associated with the context account.

2. The method of claim 1,
wherein selecting the set of relevant accounts from among the set of initial accounts comprises:
initializing a relevance score based on the at least the first criterion.

3. The method of claim 2, wherein selecting the set of relevant accounts further comprises:
ranking the initial accounts based on their corresponding relevance scores; and
selecting the set of relevant accounts from the set of initial accounts based on the ranking of the initial accounts.

4. The method of claim 3, wherein selecting the set of messages comprises:
identifying a set of candidate messages authored by the set of relevant accounts;
weighting the candidate messages based on the at least one second criterion; and
selecting the set of messages using the weighting of the candidate messages.

5. The method of claim 2, wherein weighting the initial accounts comprises weighting the relevance score based on at least one selected from a group consisting of a geographic coordination associated with one or more initial accounts, a popularity of one or more initial accounts, a number of connections of one or more initial accounts, and a ratio of inbound graph connections to outbound graph messages.

6. The method of claim 1, wherein the following relationship specifies that the context account is a distance of one from the account in the connection graph.

7. A system for identifying relevant content based on messages from a messaging platform, comprising:
a computer processor;
a content discovery module executing on the computer processor and configured to enable the computer processor to:
receive a message from an account of the messaging platform;
selecting, in response to receiving the message, a context account when the context account follows the account in a connection graph;
insert the message into a stream associated with the context account;
identify a set of initial accounts, wherein each account in the set of initial accounts does not have a following relationship with the context account within the connection graph and wherein each of the set of initial accounts is also one selected from a group consisting of a non-spare account, a top-ranked account, and a high-credibility account;
select a set of relevant accounts from among the set of initial accounts by weighting the set of initial accounts based at least on a first criterion, wherein the first criterion comprises engagement of accounts in the initial set of accounts;
select a set of messages authored by the set of relevant accounts based at least on a second criterion, wherein the second criterion comprises engagement involving messages in the set of messages; and
insert the set of messages into the stream associated with the context account.

8. The system of claim 7,
wherein selecting the set of relevant accounts from among the set of initial accounts comprises:
initializing a relevance score based on the at least the first criterion.

9. The system of claim 8, wherein selecting the set of relevant accounts further comprises:
rank the initial accounts based on their corresponding relevance scores; and
select the set of relevant accounts from the set of initial accounts based on the ranking of the initial accounts.

10. The system of claim 9, wherein to select the set of messages, the content discover module is further configured to enable the computer processor to:
identify a set of candidate messages authored by the set of relevant accounts;
weight the candidate messages based on the at least one second criterion; and
select the set of messages using the weighting of the candidate messages.

11. The system of claim 8, wherein to weight the initial accounts, the content discovery module is further configured to enable the computer processor to weight the relevance score based on at least one selected from a group consisting of a geographic coordination associated with one or more initial accounts, a popularity of one or more initial accounts, a number of connections of one or more initial accounts, and a ratio of inbound graph connections to outbound graph messages.

12. The system of claim 7, wherein the following relationship specifies that the context account is a distance of one from the account in the connection graph.

13. A non-transitory computer readable medium comprising computer readable program code for:
receiving a message from an account of a messaging platform;
selecting, in response to receiving the message, a context account when the context account follows the account in a connection graph;
inserting, based on the relationship, the message into a stream associated with the context account;
identifying a set of initial accounts wherein each account in the set of initial accounts does not have a following relationship with the context account within the connection graph and wherein each of the set of initial accounts is also one selected from a group consisting of a non-spam account, a top-ranked account, and a high-credibility account;
selecting, by a computer processor, a set of relevant accounts from among the set of initial accounts by weighting the set of initial accounts based at least on a first criterion, wherein the first criterion comprises engagement of accounts in the initial set of accounts;
selecting a set of messages authored by the set of relevant accounts based at least on a second criterion, wherein the second criterion comprises engagement involving messages in the set of messages; and
inserting providing the set of messages into the stream associated with the context account.

14. The non-transitory computer readable medium of claim 13, wherein selecting the set of relevant accounts from among the set of initial accounts comprises:
  initializing a relevance score based on the at least the first criterion.

15. The non-transitory computer readable medium of claim 14, wherein selecting the set of messages further comprises computer readable program code for:
  identifying a set of candidate messages authored by the set of relevant accounts;
  weighting the candidate messages based on the at least one second criterion; and
  selecting the set of messages using the weighting of the candidate messages.

16. The non-transitory computer readable medium of claim 14, further comprising computer readable program code for:
  ranking the initial accounts based on their corresponding relevance scores; and
  selecting the set of relevant accounts from the set of initial accounts based on the ranking of the initial accounts.

17. The non-transitory computer readable medium of claim 14, wherein weighting the initial accounts further comprises computer readable program code for:
  weighting the relevance score based on at least one selected from a group consisting of a geographic coordination associated with one or more initial accounts, a popularity of one or more initial accounts, a number of connections of one or more initial accounts, and a ratio of inbound graph connections to outbound graph messages.

18. The non-transitory computer readable medium of claim 13, wherein the following relationship specifies that the context account is a distance of one from the account in the connection graph.

19. A method for inserting messages into a stream, comprising:
  identifying a first set of messages for a context account, wherein each message in the first set of messages is authored by an account that the context account is following in a connection graph;
  identifying a second set of messages, wherein the identifying comprises:
  identifying a set of initial accounts, wherein each account in the set of initial accounts does not have a following relationship with the context account within the connection graph and wherein each of the set of initial accounts is also one selected from a group consisting of a non-spam account, a top-ranked account, and a high-credibility account,
  selecting, by a computer processor, a set of relevant accounts from among the set of initial accounts by weighting the set of initial accounts based at least on a first criterion, wherein the first criterion comprises engagement of accounts in the initial set of accounts, and
  selecting the second set of messages authored by the set of relevant accounts based at least on a second criterion, wherein the second criterion comprises engagement involving messages in the set of messages; and
  inserting the first set of messages and the second set of messages into the stream, wherein the stream is associated with context account.

* * * * *